UNITED STATES PATENT OFFICE.

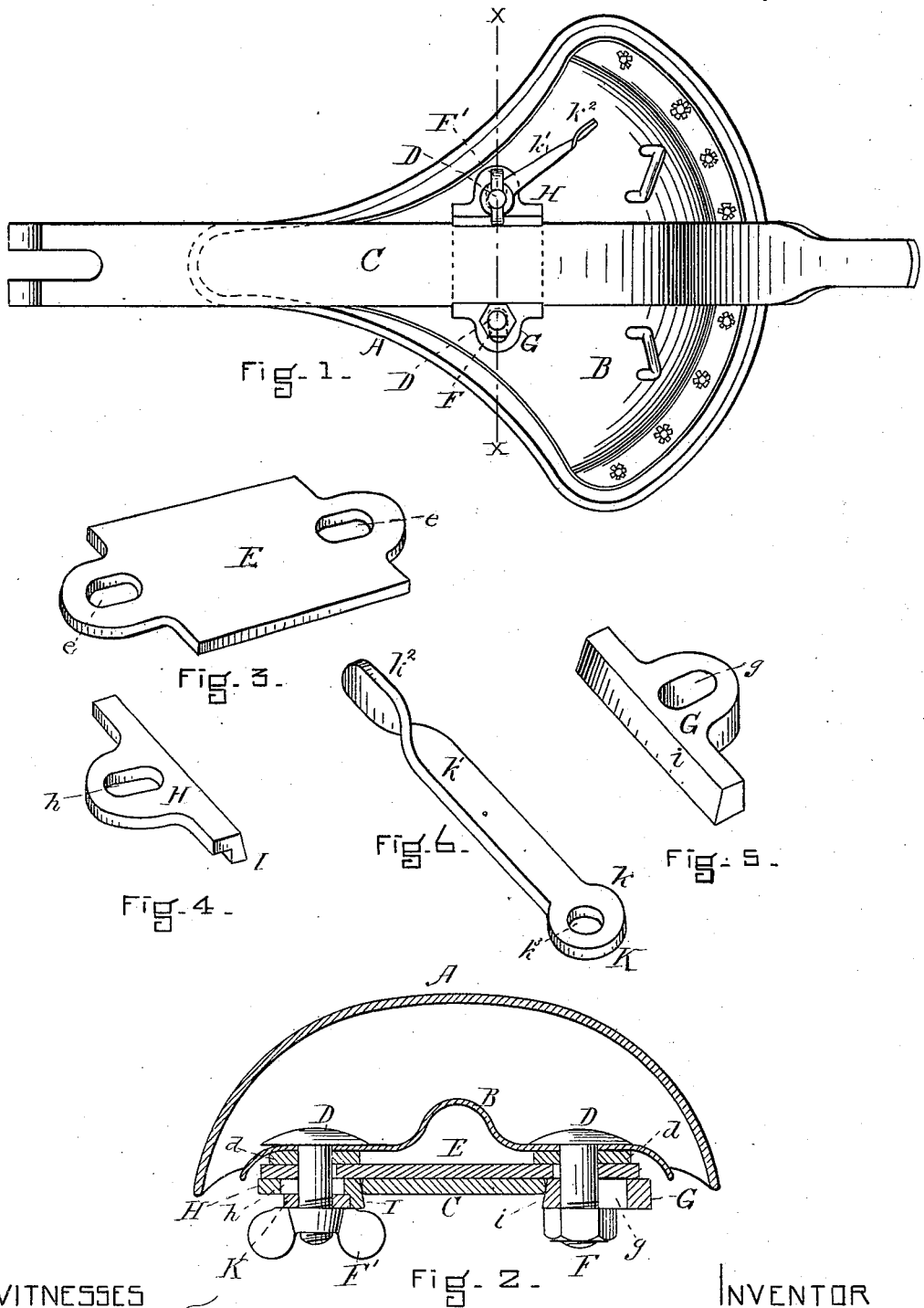

CHARLES E. PRATT, OF BOSTON, MASSACHUSETTS, ASSIGNOR TO THE POPE MANUFACTURING COMPANY, OF HARTFORD, CONNECTICUT.

VELOCIPEDE-SADDLE.

SPECIFICATION forming part of Letters Patent No. 312,219, dated February 10, 1885.

Application filed November 3, 1884. (No model.)

*To all whom it may concern:*

Be it known that I, CHARLES E. PRATT, of Boston, in the county of Suffolk and State of Massachusetts, have invented certain new and useful Improvements in Velocipede-Saddles, of which the following is a specification.

My improvements relate to the seats or saddles for the riders, attachable to the springs and frames of bicycles and tricycles and other velocipedes, and more particularly to the attachments by which such seats are secured to the springs or frames of such velocipedes.

Heretofore the bicycle-saddle, for instance, has generally been secured to the spring on which it rests by means of two bolts through the saddle-plate, one on either side of the spring, a thin metallic plate on the opposite side of the spring from the saddle-plate, through which said bolts passed, and nuts on said bolts outside of the plate for screwing up said plate, so that the spring was tightly held between the plate and the saddle-plate. The saddle could thus be adjusted and set in any position along the spring; but it required great tightness of the nuts, by means of wrenches, to hold the saddle in position, and much inconvenience in adjusting it. It has also been found to be an insecure method of attachment, and one not admitting of ready removal, attachment, or adjustment by the rider—qualities very desirable in a velocipede-saddle. An objection is found, also, in the interposition of the metallic plate between the spring and the perch of the bicycle, whereby the necessary distance is increased between the spring and the perch, and the shock of the weight of the rider, when passing over an obstruction exceeding the resistance of the spring, is conveyed to the backbone upon substantially one spot.

It is the object of my invention to avoid these objections and to provide a saddle with a simple, ready, convenient, correct, and secure means of attachment to the spring, by which the saddle may readily be removed at any time, and as readily replaced and quickly adjusted fore and aft upon the spring.

In the drawings, Figure 1 shows a plan of the under side of the saddle and the spring, with my improvements in one form. Fig. 2 shows a cross-section of the same on the dotted line $x$ $x$. Figs. 3, 4, 5, and 6 show parts of my devices in detail and in perspective, which will be more fully described.

A is the flexile portion of the saddle.
B is the metallic supporting or saddle plate to which the flexile portion is attached.
C is the spring.
D D are bolts through the saddle-plate.
E is a supplementary or intermediate plate containing slots $e$ $e$, adapted to be placed over the bolts D D on the under side of the saddle and to afford a bearing upon the spring.
F F' are nuts, of which I preferably make one, F', a thumb-nut.
G and H are clamps, or dogs, or followers, having slots $g$ $h$ for the bolts D D, and elongated, so as to allow a motion on the bolts toward and from the spring when in place thereon. I preferably make the sides I $i$ of these followers slightly beveled, and they may be notched or serrated to correspond with notches or serrations on the sides of the spring, or may be made in any other form, so as to take a good hold of the spring when pressed against it. The spring may be beveled, notched, or serrated to correspond with the faces I $i$. I also make one of the followers, H, thinner, except at the side I, or, in other words, cut it away to one-half thickness, to make room for the operation of the cam.

K is the cam or eccentric plate, having the hole or slot $k^3$, to allow the bolt D to pass freely through it, and the side $k$ of greater width than the opposite side.

The cam-plate K and the hole or slot $k^3$ may be circular, but eccentric in relation to each other, or may be in any other form so as to get the operation of the cam in forcing one of said followers toward the other.

I make the cam-plate K, as shown in Fig. 6, with a projection or handle, $k'$, twisted up to form a thumb and finger piece or handle, $k^2$; but it may be made in any other form, or any other means may be used for moving the cam.

I have shown these devices, as in Fig. 2, with washers of rubber or leather or other material, $d$ $d$, placed on the bolts D D next the saddle-plate B, and with the intermediate or spring plate, E, placed next to the washers on said bolts, and the dogs or followers G H placed next to said spring-plate on said bolts, and the cam K placed on one of said bolts D, next to the follower H, and the nuts F F' placed next to said follower G and cam K on said bolts, with the followers G H slotted for adjustment, and both the bolts threaded for adjustment to the nuts; but the washers $d\ d$ or the spring-plate E may be dispensed with; or the follower or dog G may be fixed and without adjustment; or the bolt D on one side may be simply a rivet; or the dog G may be made in one piece with the plate E; or other modifications in form may be made without departing from my invention.

The operation of these devices is as follows: All parts being in place, as described, cam K is turned so that its thinnest side is next the raised side I of the follower H, and the follower H is moved back closely against it. The follower G is then moved toward the follower H until it allows about space enough between the face I and the face $i$ of the followers for the spring to pass freely in and out, or, in other words, for the saddle to be placed freely on and off the spring, and with the follower G in such a position that when the side $t$ is pressed against the spring the saddle will be in the right position or line fore and aft on the spring. Then the nut F is screwed down closely, holding all the parts on its bolt D and in good position. The nut F' being turned up only tight enough to hold the parts on its bolt D in place so that the cam may turn, the cam K is turned by means of the thumb-piece $k^2$ until the piece I of the follower H is forced by it tightly against the spring C, when the cam will be in the position shown in Fig. 1. The nut F' is then turned up more tightly, to hold the parts on its bolt D, including the cam K, securely in position. To release the saddle from the spring, the nut F' may be loosened or not, as may seem necessary; but cam-lever K $k'\ k^2$ is turned back, so that the thinner side of the cam is between the bolt D and the side I of the follower H, when the saddle may be immediately taken off the spring or moved forward or backward upon it. When saddles are made for springs of even width according to this plan, the dog G need not be detachable; but if they are to be used on springs of different widths it will be found expedient to make it adjustable.

It may be found expedient to place washers on the bolts between the nuts and the dogs, or between the nuts and the cam, or to modify the construction for different shapes or constructions of springs.

The plate E is designed to offer, besides or even instead of a supporting-surface for the saddle upon the spring, a strengthening brace or plate to keep the bolts D D from spreading apart under the action of the cam, or under any strain upon the saddle or spring.

I claim as new and of my invention—

1. In a velocipede-saddle, and combined with mechanism for attaching the saddle to the spring or perch, a cam, K, constructed with eccentric $k$, handle $k'\ k^2$, and slot $k^3$, essentially as set forth.

2. In a velocipede-saddle, an adjustable or movable dog and screw or cam mechanism or equivalent, for actuating it upon the edge of the spring or other portion of the frame, to adjust and hold the saddle in position, essentially as set forth.

3. In combination with a velocipede-saddle, a plate, E, constructed to afford a bearing upon the spring or other portion of the frame, and to form a bed for and take the strain of dogs or equivalent devices acting longitudinally upon it to adjust and hold the saddle in place, essentially as set forth.

4. The combination of saddle-plate B, bolts D D, dogs G H, cam K, nuts F F', and spring C, essentially as shown and described.

5. The combination, in a velocipede-saddle, of mechanism for connecting the saddle with a spring, and an eccentric device for tightening and securing said mechanism in position upon the spring, essentially as set forth.

6. In combination with the plate or frame of a saddle, a fixed dog and a movable dog, and a cam or its equivalent for operating the latter, essentially as set forth.

7. In combination with a saddle and mechanism for attaching it to a spring, a bolt, D, nut F, and an adjustable dog, G, constructed and adapted to co-operate with another dog or its equivalent on the opposite side of the spring to hold the saddle and spring together, essentially as set forth.

CHARLES E. PRATT.

Witnesses.
  E. P. J. MORTON,
  A. H. FISKE.